DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 2, 1976

944 O.G. 41

T944,005

HOT MELT ADHESIVE

Richard J. Brewer, 920 Springbrook Drive 37663; Ralph A. Chambers, 904 Clearwood Ave. 37660 and Brice S. Wininger, 1015 Wood Edens Drive 37660, all of Kingsport, Tenn.

Continuation of abandoned application Ser. No. 401,492, Sept. 27, 1973. This application Nov. 19, 1974, Ser. No. 525,256

**Int. Cl. C08l *1/10***

U.S. Cl. 106—180

No Drawing. 10 Pages Specification

Hot melt adhesive composition comprising a cellulose ester, a plasticizer ester and a dicarboxylic acid or anhydride, especially useful on kraft paper or corrugated paperboard which is to be repulped.